(12) United States Patent
Roddis (10) Patent No.: US 9,010,494 B2
(45) Date of Patent: Apr. 21, 2015

(54) BEARING LUBRICATION

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 1640 days.

(21) Appl. No.: 11/993,415

(22) PCT Filed: Jun. 20, 2006

(86) PCT No.: PCT/GB2006/002247
§ 371 (c)(1),
(2), (4) Date: Dec. 27, 2007

(87) PCT Pub. No.: WO2007/028935
PCT Pub. Date: Mar. 15, 2007

(65) Prior Publication Data
US 2010/0193295 A1 Aug. 5, 2010

(30) Foreign Application Priority Data
Jun. 20, 2005 (GB) .................................. 0512475.5

(51) Int. Cl.
| | | |
|---|---|---|
| *F01M 1/00* | (2006.01) | |
| *F16N 7/30* | (2006.01) | |
| *F16C 33/66* | (2006.01) | |
| *F16C 35/04* | (2006.01) | |
| *F16N 7/32* | (2006.01) | |

(52) U.S. Cl.
CPC ......... *F16C 33/6674* (2013.01); *F16C 33/6662* (2013.01); *F16C 33/667* (2013.01); *F16C 35/04* (2013.01); *F16N 7/32* (2013.01)

(58) Field of Classification Search
CPC ............... F16N 7/32; F16N 7/34; F16N 7/38; F16C 33/6662; F01D 25/18
USPC ........................................ 184/6.26, 55.1, 55.2
See application file for complete search history.

(56) References Cited

U.S. PATENT DOCUMENTS

| | | | | |
|---|---|---|---|---|
| 2,050,368 A | * | 8/1936 | Neely ............................ | 239/406 |
| 2,702,093 A | * | 2/1955 | Sherrill ........................ | 184/6.26 |
| 2,762,664 A | * | 9/1956 | Manning et al. .............. | 384/468 |
| 2,986,433 A | * | 5/1961 | Herrmann .................... | 384/468 |
| 3,017,230 A | * | 1/1962 | Meermans ................... | 384/479 |
| 3,244,375 A | * | 4/1966 | Davis, Sr. et al. ............ | 239/403 |
| 3,515,676 A | * | 6/1970 | Hierta et al. ................. | 261/78.2 |
| 3,605,942 A | * | 9/1971 | Lyth .............................. | 84/6.26 |
| 3,612,631 A | * | 10/1971 | O'Connor .................... | 384/468 |
| 4,201,276 A | * | 5/1980 | Bardin et al. ................ | 184/55.2 |
| 4,335,804 A | * | 6/1982 | Bardin et al. ................ | 184/55.2 |
| 4,502,274 A | * | 3/1985 | Girault ........................ | 60/39.08 |
| 4,637,493 A | * | 1/1987 | Ehlert .......................... | 184/55.1 |
| 5,020,636 A | * | 6/1991 | Daeges ........................ | 184/6.26 |
| 5,125,480 A | * | 6/1992 | Gregory et al. .............. | 184/6.26 |
| 5,318,152 A | * | 6/1994 | Ehlert .......................... | 184/6.26 |

(Continued)

FOREIGN PATENT DOCUMENTS

| | | |
|---|---|---|
| DE | 10 34 430 B | 7/1958 |
| EP | 0350734 A1 | 1/1990 |
| GB | 678105 A | 8/1952 |

*Primary Examiner* — Henry Liu
(74) *Attorney, Agent, or Firm* — Edwin D. Schindler (57) ABSTRACT

A lubrication apparatus for lubricating a surface of at least one component of a piece of equipment, which includes a lubrication mist generating unit in which air and a lubricant are combined to form a lubricant mist. A device is included for directly connecting the lubrication mist generating unit to the equipment at a position adjacent the surface to be lubricated.

10 Claims, 12 Drawing Sheets

(56) References Cited

U.S. PATENT DOCUMENTS

| | | | |
|---|---|---|---|
| 6,065,689 A * | 5/2000 | Kizer et al. | 239/126 |
| 6,070,698 A * | 6/2000 | Wells | 184/55.2 |
| 6,234,459 B1 * | 5/2001 | Rock | 261/79.2 |
| 6,290,024 B1 * | 9/2001 | Ehlert | 184/6.26 |
| 6,311,984 B1 * | 11/2001 | Orlowski | 277/418 |
| 6,669,176 B2 * | 12/2003 | Rock | 261/79.2 |

* cited by examiner

BEARING LUBRICATION

FIELD OF INVENTION

The present invention relates to the lubricating of bearings with an oil mist formed by combining oil and air.

BACKGROUND OF THE INVENTION

For many years centralised oil mist lubrication systems have been used to provide continuous lubrication to rotating equipment bearings. Oil mist lubrication gives benefits over other lubrication methods, providing:
  reduced heat generation by the rotating elements
  reduced equipment power consumption
  reduced wear of the rotating and stationary elements
  lower oil consumption, and
  positive pressurisation of the bearing housing to prevent the ingress of particulate contaminant and moisture.

Oil mist lubrication is of use in many situations including with modern bearing seals such as magnetic face seals.

However, oil mist systems may be difficult to justify because of their cost, complexity and commissioning time.

U.S. Pat. No. 5,318,152 discloses a lubricating system in which a plurality of bearings of one or more bearing equipped items are lubricated from a centralised oil mist generator. This system includes an oil mist generator, a distribution assembly for distributing the oil mist from the oil mist generator to the bearings, a collective device for collecting excess oil and oil mist from the bearings and a return assembly through which excess oil and oil mist are returned to an oil mist collection/supply vessel for re-use.

This system therefore relies on components, which are additional to the bearing housing. This centralised approach is not only costly, as it requires the additional components, but it also:
  takes up considerable physical space,
  requires extensive commissioning time and expertise,
  gives rise to costs to run distribution pipework, in industry, in excess of US$100 per foot, given all the resources required not only to plan and approve such a pipework network but also maintain it.
  represents a compromise solution given that oil mist is distributed from a centralised system to multiple types of equipment, such as electric motors, pumps, and gearboxes. Since the lubrication requirements of each type of equipment vary with bearing size, number of rolling elements and speed of operation, a compromised/non-idealised oil mist flow must be selected. This also means that the base oil type selection has to be compromised, since some types of equipment require different oil characteristics, for example, gearboxes may need oil anti-spalling and/or wear properties, pumps may need reduced rust formation properties, and motors may need an oxidisation inhibitor.
  when equipment is replaced with different sized equipment, centralised systems offer little flexibility, or oil misting conditions are never changed in practice to meet the requirements for the replaced equipment.
  centralised systems, containing venturi/vortex generation heads are often over sized since engineers wish to anticipate the future additional equipment needs. Unfortunately, this creates a far from ideal operation, and mist delivery is compromised as large generator heads create larger oil mist particles which then coalesce in the pipework before reaching the equipment
  coalescing oil can interfere with the mist distribution in a centralised oil mist system, leading to blockage at the source. Clearly as the centralised systems supply multiple pieces of equipment a blockage leads to these multiple pieces of equipment failing which is clearly a very risky and costly operation.
  distribution pipework, from a centralised system, must be inclined from the source, so to allow coalesced oil mist to run back to the source under gravity. This requirement causes practical difficulties in an industrial plant with equipment positioned in different three-dimensional locations. It is practically impossible to implement a suitably inclined pipe distribution system, which satisfactorily meets this requirement.
  centralised systems can only feed equipment in an approximate 500 m radius given that oil mist coalesces at the interior surface of the pipework prohibiting longer distribution runs.
  multiple reclassifier nozzles lead to confusion, misapplication and installation errors. Many oil mist installations fail because of simple errors from the system suppliers and those involved in selection, set-up and configuration. Laws of probability state that complex systems create more problems. Centralised systems can only be described as complex.

STATEMENTS OF THE INVENTION

Thus, there are no intervening conduits or other items between the housing within which the oil mist is generated and the equipment to be lubricated apart from, for instance, an outlet from the housing which makes a screw-threaded or other connection with an inlet of the equipment.

Thus, there are no intervening conduits or other items between the housing within which the oil mist is generated and the equipment to be lubricated apart from, for instance, as outlet from the housing which makes a screw-threaded or other connection with an inlet of the equipment.

Preferably, the piece of equipment is a bearing structure which includes a bearing bushing and one or more bearings for supporting a rotating shaft of, for instance a pump. Preferably, said two or more surfaces are counter-moving and said lubricant mist provides lubrication to said surfaces.

Preferably, said counter-moving surfaces are in the form of a bearing

Figure 1:
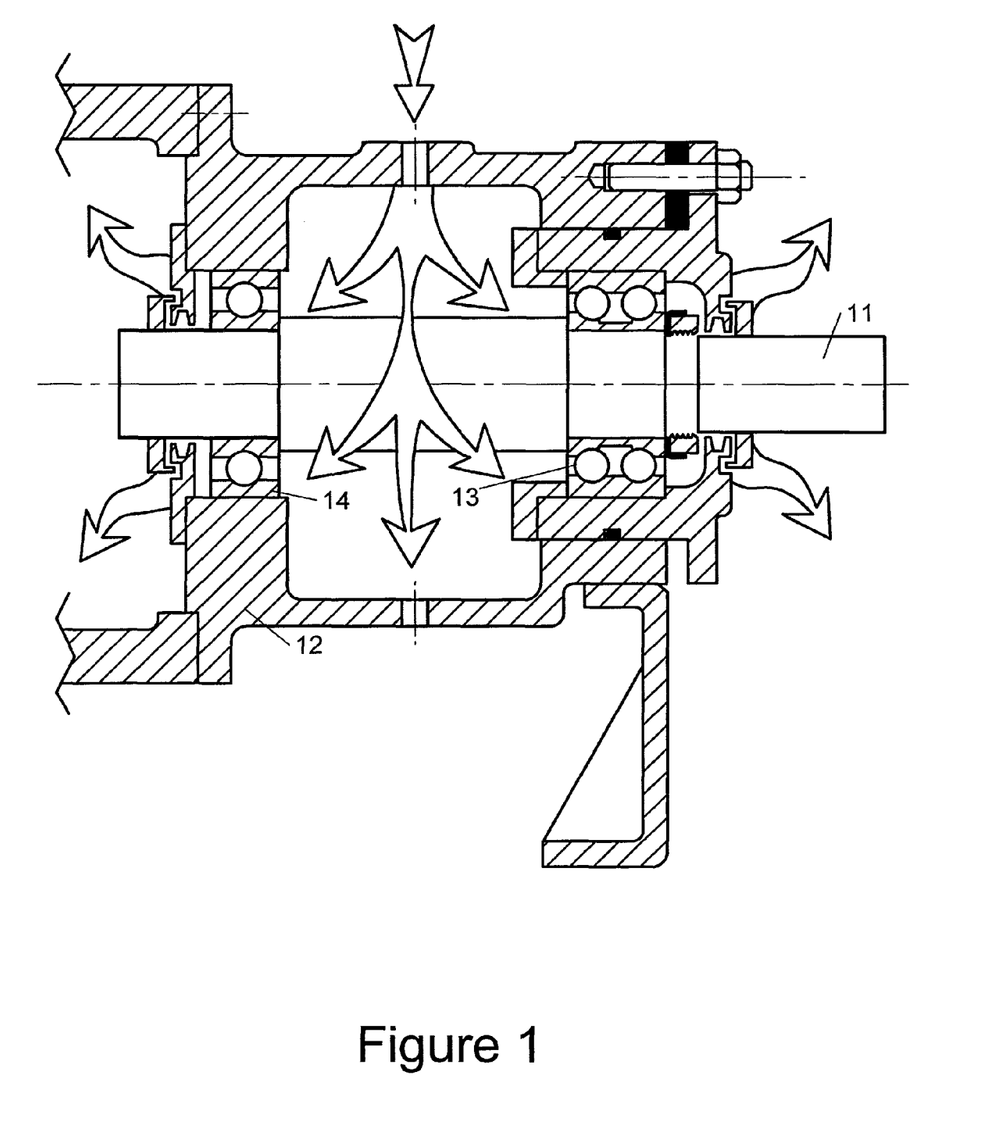
Figure 2:
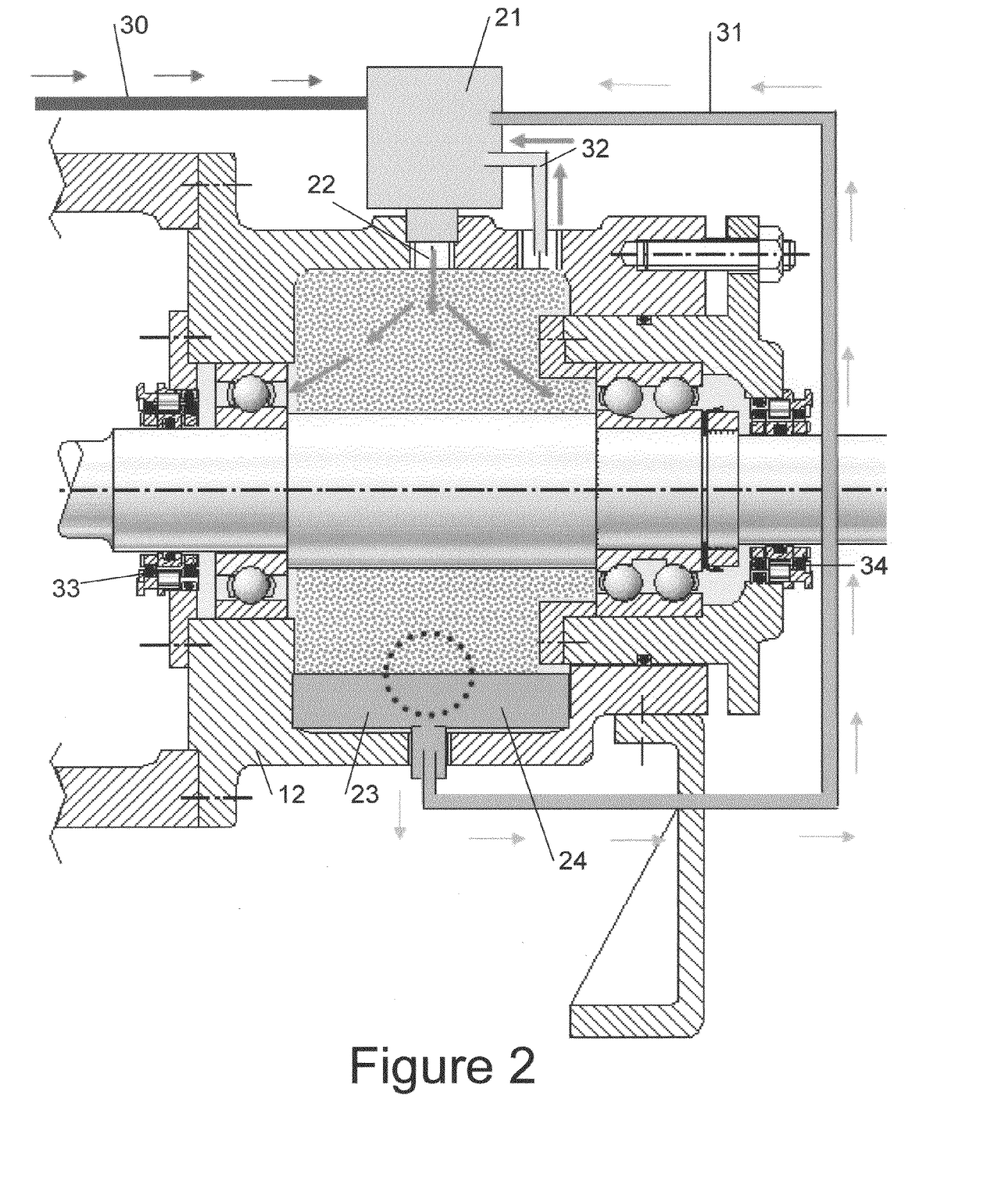

Preferably, said lubrication mist generating unit is attached directly to the bearing housing, containing a bearing and a longitudinal shaft Preferably, said lubrication mist generating unit is adapted to be directly connectable to a port provided in the radial wall of the bearing housing. In conventional systems, such as is shown in FIG. 1, a port or orifice is provided within the wall of the bearing housing in order to allow for the filling and maintenance of lubricant levels with the housing. This port may be capped or fitted with an expansion device.

Preferably, said lubrication mist generating unit includes a conduit or pipe, which extends from said unit to a lubricant reservoir located within the piece of equipment. Preferably, said reservoir is an integral part of the bearing housing.

Preferably, the system includes a lubricant mist return which extends from the bearing housing to the mist generation unit, thereby creating a substantially closed loop system wherein the used lubricant mist is re-circulated to the lubricant mist generating unit.

Accordingly, the present invention provides apparatus designed to connect directly into an existing bearing housing structure, thus providing individual and local oil mist generation for each item of rotating equipment.

This system of the invention removes the need for:
- additional components, for example, vessels for storage of the lubricant and/or generated oil mist.
- costly distribution and return (if applicable) pipework systems, involving planning and commissioning are eliminated, as are the impracticalities of having to incline said pipework from the central source.
- the ideal/correct oil grade can be individually selected to suit each item of rotating equipment, without compromise.
- the complexity and misplacement of localised reclassifiers in a centralised system is eliminated.
- baffle blockage from wax formation, thermal decomposition or sludge is eliminated/reduced, as is the risk of failing multiple items of rotating equipment from a centralised blockage, and
- issues and drawbacks surrounding oversizing of a centralised system to accommodate future plant expansion needs.

It is also of advantage if the localised system of the inventions further provides:
- an integral oil mist debris catcher
- localised oil reservoir for a quick start supply to the application
- washable, life-long filtration, not material based filtration with a finite short life expectancy, and
- integral non-return valve, preventing filtered flow of air/mist to escape to atmosphere when in operation, but the prevention of air and moisture entry when system is not in operation, thus replacing the need for a separate expansion chamber when oil mist supply is not required. A modular unit which can either be employed to generate oil mist or to be used as an expansion chamber provides technical and commercial advantages to the user and supplier.

For clarity, the terms reservoir, lubricant sump and lubricant reservoir are synonymous as used herein.

In one embodiment of the present invention, a reservoir unit is directly connectable into the mist generating unit.

In another embodiment of the invention, a reservoir unit is directly connectable into the bearing housing.

Preferably, the reservoir has a clear, see-through construction, so that a user can determine the lubricant level within said reservoir.

Preferably, lubricant mist is provided by air entering a vortex device within the lubrication mist generating unit on oil supply being provided adjacent to the vortex device whereby vortexed air mixes with the oil and forms a mist.

Preferably, an air feed means extends between the vortex device and an air supply, more preferably in the form of at least one constricted channel, said constricted channel entering said vortex device in a substantially tangential manner.

The sides of said constricted channel may be substantially parallel in width and depth, or they may be inclined to each other.

Preferably, two or more air vortex means are provided in the lubricant mist generating unit.

Preferably, lubricant mist is provided by air entering a venturi of the lubrication mist generating unit, and adjacent to said venturi is an oil supply, said venturied air being mixed with said oil and forming a mist.

Preferably, said mist directly communicates with the innermost radial surfaces of said bearing housing.

Preferably, said oil is contained in a reservoir adjacent to said mist generation means.

Preferably, the means for re-circulation of the used lubricant mist comprises a second air stream which creates a low pressure within the lubricant mist generating unit inducing a flow of the lubricant mist back into the unit.

Preferably, said lubricant mist generating unit contains a mist return orifice which communicates to a venturi cavity, said venturi cavity also communicating with the second air stream.

Preferably, said venturi cavity contains at least one substantially conical surface.

Preferably, said air supply is delivered through the innermost radial surface of said venturi cavity and said lubricant mist return is delivered to the outermost radial surface of said venturi cavity.

Preferably, the apparatus includes a filter, through which the lubricant mist must pass in order to escape to atmosphere. Preferably, said filter is an integral member of the lubricant mist generating unit.

Preferably, said filter is of substantially metallic construction, more preferably of micron size porosity between its innermost and outermost surface. Preferably, said filter coalesces said lubricant mist into a lubricant fluid.

Preferably, a non-return means is provided adjacent to said filter, so that filtered mist/air can vent, yet atmospheric air/moisture can not enter past said non-return means.

Preferably, a communication means is provided to allow said coalesced lubricant fluid to return to the reservoir.

Preferably, at least one magnet is provided in said reservoir to attract any metallic debris in said lubricant.

Preferably, an intelligent lubrication system is provides by the use of at least one monitoring device which detects a system upset and alerts the user.

Preferably, said monitoring device monitors the flow of the returned mist back into the lubricant mist generating unit and provides an alert when a no/low flow is detected.

Preferably, said monitoring device monitors the level of the lubricant in the reservoir and provides an alert when a low lubricant level is detected.

More preferably, the system is intelligent and auto-corrective and the detection of a no/low mist return flow activates a regulator, which increases the air flow/pressure to the mist generation unit which thus increases the mist return flow and resets the low flow monitoring device.

Most preferably, the system is intelligent and auto-corrective and the detection of a low lubricant level in the reservoir induces corrective flow of replacement lubricant into the system, which thus increases the lubricant level and resets the low level monitoring device.

Preferably an adjustable throttling means is provided to regulate the air supply and/or mist flow.

Preferably, an air filtration system is provided to control the quality of the air supply to the lubrication mist generating unit.

Preferably, a lubricant refill means is provided in the lubricant mist generation unit, said refill means consists of a communication channel from the outermost surface of said mist generation unit to the bearing housing and/or reservoir.

Preferably, the apparatus contains no moving parts.

Preferably, the apparatus of the invention is employed on a bearing housing which contains sealing elements which contain the lubrication mist within said bearing housing.

In a preferred embodiment, the above described apparatus employed with the reservoir of the bearing housing, removes the need for additional vessels for the storage of the lubricant and/or generated mist, distribution piping for the lubricant and lubricant mist and connection means between the distribution piping and the aforesaid vessels.

Oil mist generated in the system of the invention comprises oil mist droplets of 1-10 microns in size, preferably in the range of from 1-3 microns in size. As a result of this small droplet size the contaminants that can cause bearing failure will not remain in the lubricant mist suspension and the oil mist has therefore been described as the ultimate oil filter.

In addition pure oil mist has been found to deposit a wear resistant, carbonaceous dry film on the wear surface of the bearings. This carbonaceous layer enables the machinery to operate safely for up to 8 hours even when the flow of oil mist fails.

Oil mist can be applied in two formats; Pure mist, dry reservoir, or where the lubricant fluid level below the bearing and no splash lubrication means provided, or Purge mist, wet reservoir lubrication, where the lubricant fluid level is in contact with the bearing or where the lubricant fluid is below the bearing and a splash lubrication means is provided.

In the apparatus, according to the present invention, the bearing housing is filled with a combination of fluid lubricant in the reservoir and an aerosol/mist of the lubricant above the fluid level and provided by the lubricant mist generating unit. The level of the liquid lubricant within the housing of the invention determines whether the system operates in purge or pure mode.

In one embodiment of the invention the apparatus operates in the pure mode. In an alternative embodiment of the invention the system operates in the purge mode. In a further preferred embodiment of the invention the operation of the apparatus is switchable between the pure and the purge modes and this is dependent on the level of liquid lubricant present.

In some modes of operation it may be preferable for the air and/or lubricant to be pre-conditioned prior to entry into the lubricant mist-generating unit. For example the air and/or lubricant is heated, cooled or filtered prior to entry into the lubricant mist generating unit and the system is provided with appropriate means for doing this.

In a preferred embodiment of the invention, the lubricant provided within the system is oil and since each reservoir is equipment specific, each lubrication media, or grades of media/oil, can be selected according to the specific equipment requirements.

The lubricant mist-generating unit is preferably connected into the top of the bearing housing to form a lubricant mist-generating head. Alternatively the lubricant mist-generating unit is connected into a sidewall of the bearing housing.

According to a further aspect of the invention there is provided a method for lubricating a bearing with a lubricant mist comprising the steps of;

i) connecting a lubricant mist generating means directly into a bearing housing;

ii) connecting an air supply to the mist generating means;

iii) connecting a lubricant media feed means to the mist generating means, and, optionally, connecting a mist return means to the mist generating means;

iv) filling the reservoir with the lubricant media;

v) activating the air supply to the mist generating means.

By means described above, the present invention removes a substantial amount of costs, complexity, risk and commissioning time to the user compared to traditionally centralised misting systems. Additionally the inherent design allows for a direct migration path for the user from traditional lubrication to a purge or pure system, and back again, if deemed necessary, without major cost or major system/equipment modifications.

BRIEF DESCRIPTION OF THE DRAWINGS

FIG. 1 shows a part longitudinal cross section of the bearing chamber of a centrifugal pump with traditional non-contacting labyrinth seals, with inlet orifice in said chamber for mist entry;

FIG. 2 corresponds to FIG. 1 and shows a longitudinal cross section of the bearing chamber of a centrifugal pump, with apparatus of the invention attached to said inlet orifice;

FIG. 3 corresponds to FIG. 2 and shows an alternative configuration of the invention with apparatus of the invention attached to another bearing housing orifice, providing mist purge means through the bearings;

FIG. 4 shows a longitudinal part cross section of an electric motor with the apparatus of the invention attached to a reservoir, in turn attached to the motor;

FIG. 5 shows a longitudinal part cross section of a pillow block with apparatus of the invention attached to an upper orifice, a reservoir being attached to the bearing housing;

FIG. 6 shows a longitudinal cross section of the mist generation unit of the invention;

FIG. 7 corresponds to FIG. 6 and shows the view on Section X-X;

FIG. 8 also corresponds to FIG. 6 and shows an alternate view on Section X-X;

FIG. 9 shows a longitudinal cross section of an alternate mist generation unit of the invention;

FIG. 10 corresponds to FIG. 9 and shows the view on Section Y-Y;

FIG. 11 corresponds to FIG. 6 and shows an option to remotely add lubricant fluid into the system to increase the lubricant fluid level in the reservoir; and FIG. 12 corresponds to FIG. 6 and shows an option to add a mist return flow-monitoring device which detects a no/low flow condition and alerts the user.

DETAILED DESCRIPTION OF THE INVENTION

The invention will now be described, by way of examples only, with reference to the accompanying drawings.

FIG. 1 shows an item of rotating equipment, such as a centrifugal pump 10 (not shown), with a rotating shaft 11 and a stationary bearing housing 12. The bearing housing 12 houses bearings 13 and 14 which are radially connected to the shaft 11. The shaft 11 is also rotationally coupled to bearing seals 16 and 17 and said bearing housing 12 contains a bearing lubricant fluid in traditionally supplied mist form 18, which lubricates and cools the bearings 13 and 14 during dynamic operation of the rotating equipment 10.

FIG. 2 is similar to FIG. 1 and illustrates a first embodiment of the invention, in which a lubricant mist generating unit 21 is attached directly to the bearing housing 12 via an appropriate orifice 22.

At the bottom of the bearing housing 12 is an integral reservoir 23 which is commonplace in most items of rotating equipment. Bearing lubricant fluid 24 is added to the reservoir until the desired fluid level is reach, depending if the application is intended to run in pure or purge mode.

An air supply 30 is connected to the lubricant mist generating unit 21, and feed line 31 is connected from the lubricant mist generating unit 21 to communicate with the fluid in the reservoir 23.

Preferably, although not essentially, a mist return line 32 is connected from the bearing housing 12 to the lubricant mist generating unit 21.

Preferably, seals 33 and 34 are employed to retain the lubricant mist 35 in the bearing housing 12.

In operation, air 30 is fed to the lubricant mist generating unit 21. The mechanisms inside the lubricant mist generating unit 21 create a puffing action to suck the lubrication fluid 24, in the form of an oil, from the reservoir 23 along the feed line 31 to the lubricant mist generating unit 21.

Oil 24 is then mixed with the air 30 inside the lubricant mist generating unit 21 and oil mist 32 is formed. The mist 32 then enters the bearing housing 12 and lubricates the bearings 13 and 14.

Oil mist 24 is encouraged to return back to the lubricant mist generating unit 21 via the return line 32. The returned oil mist 32 is filtered and coalesed fluid oil 24 returns via gravity to the reservoir 23.

The above described configuration is a closed loop oil mist system operating with a blanket mode; the oil mist 32 fills the bearing housing 12 and is not forced through the bearings.

Figure 3:
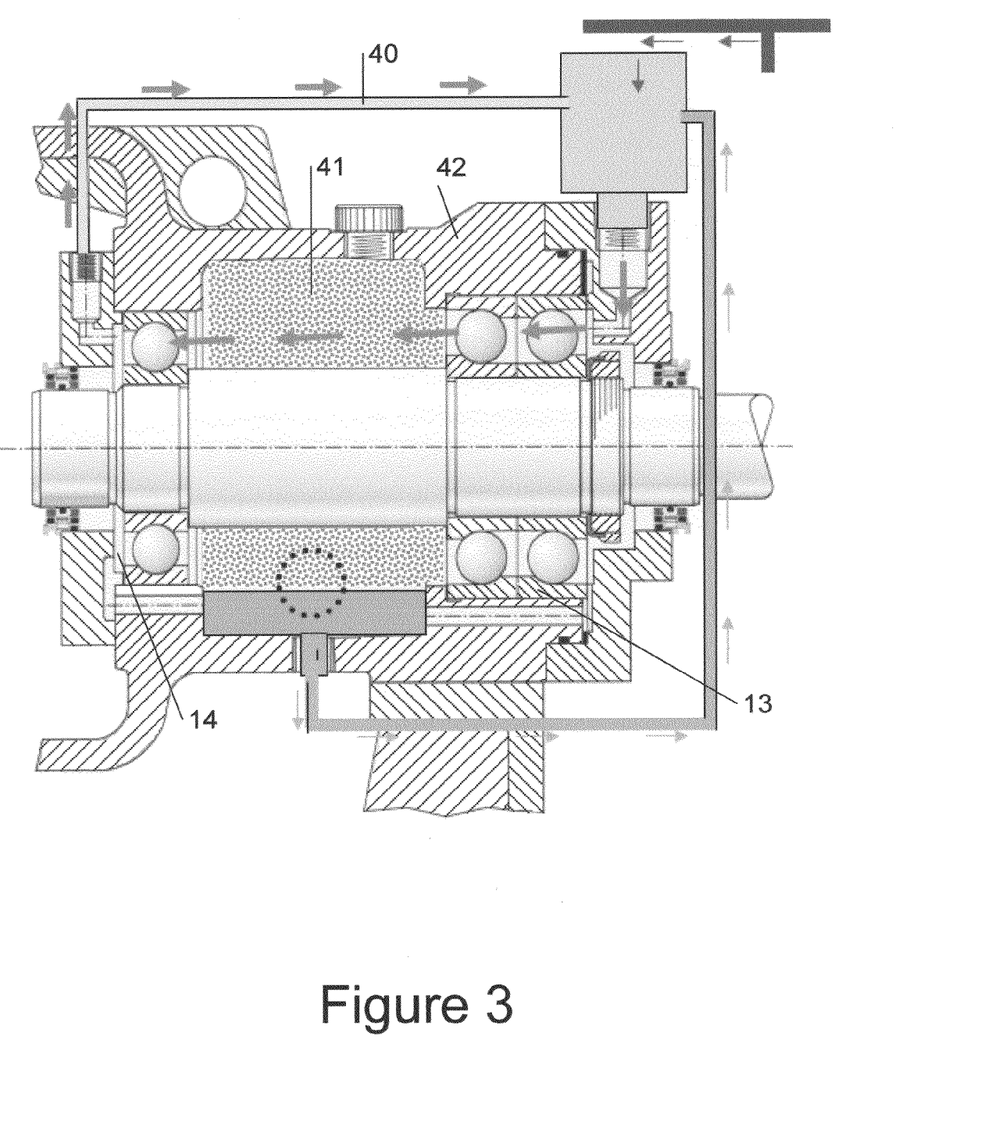

FIG. 3 shows a second embodiment of the invention, in which the lubrication system, as previously described, has the lubricant mist generating unit 21 connected to one longitudinal side of the bearing 13.

The mist return line 40 is connected to the opposite longitudinal side of the other bearing 14.

Therefore, oil mist 41 entering the bearing house 42 is forced through both sets of bearings 13 and 14 before it can return back to the lubricant mist generating unit 21 via the return line 40.

Figure 4:
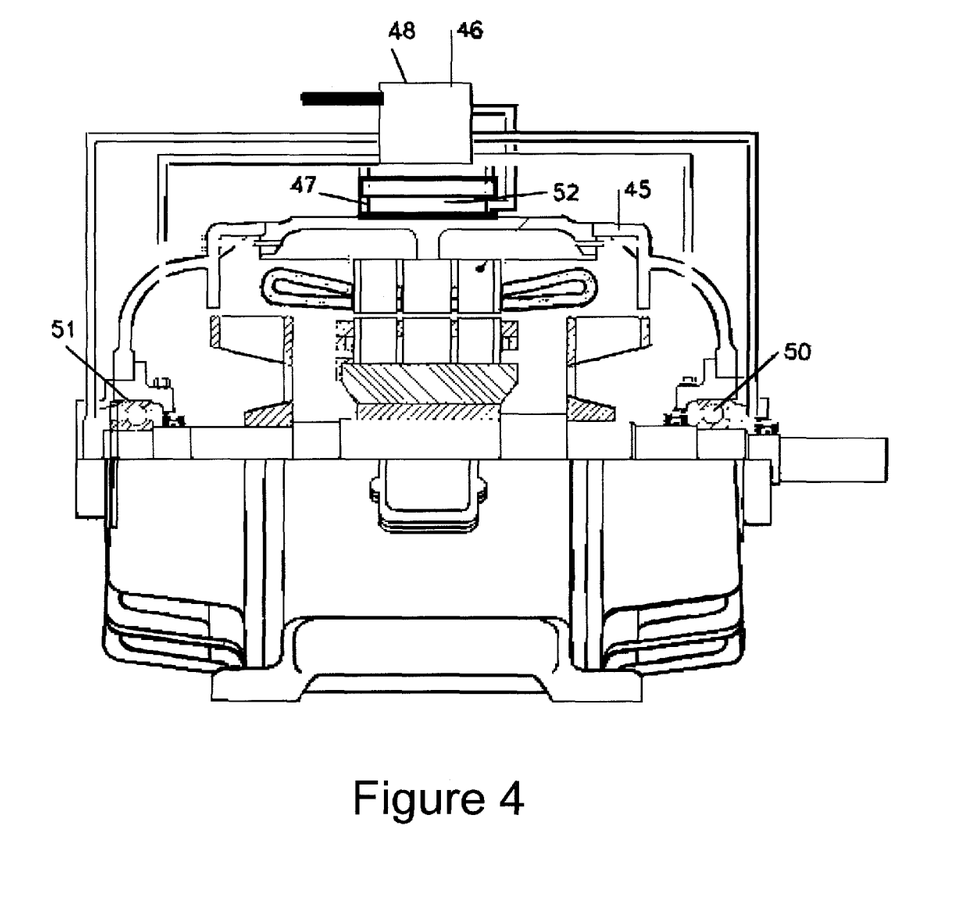

FIG. 4 shows a longitudinal part cross section of an electric motor 45 with the lubrication system of the invention 46 attached to a reservoir 47, which is in turn attached to the motor 45.

A limited number of types of equipment do not have the integral reservoir option. In such cases, the embodiment of the invention provides for an attached equipment reservoir 47 substantially adjacent and beneath the lubricant mist generating unit 48. The system thus provides local mist 49 supply to the equipment bearings 50 and 51, then is returned back to the lubricant mist generating unit 48.

Preferably, the attached equipment reservoir 47 is manufactured from a see through material such as transparent UV stable plastic. This provides the user with a visual check to determine the level of the lubrication fluid 52 in the reservoir 47.

Figure 5:
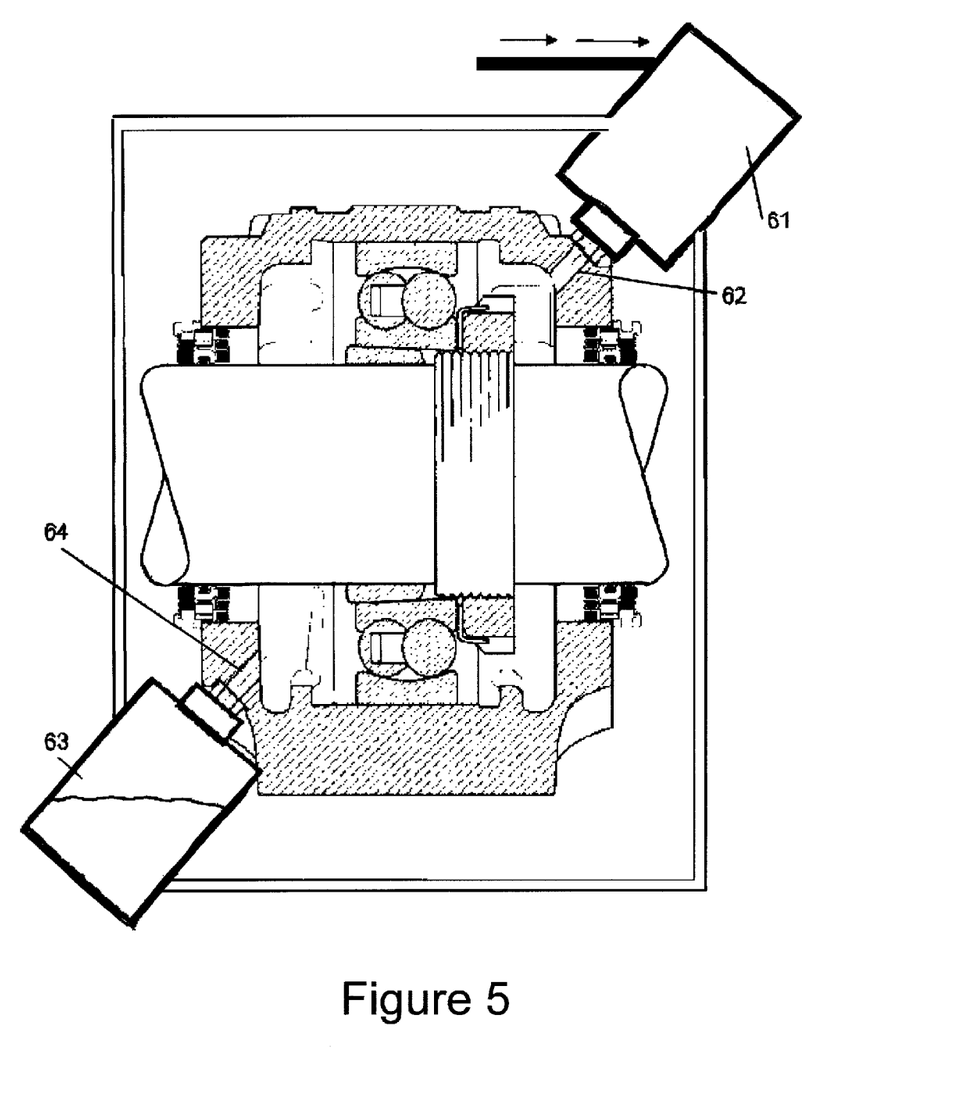

FIG. 5 shows, by way of example only, a longitudinal part cross section of a pillow block 60 with the lubrication system of the invention 61 attached to an upper orifice 62 of the pillow block 60 and an attached equipment reservoir 63 attached to the lower orifice 64 of the pillow block 60.

Figure 6:
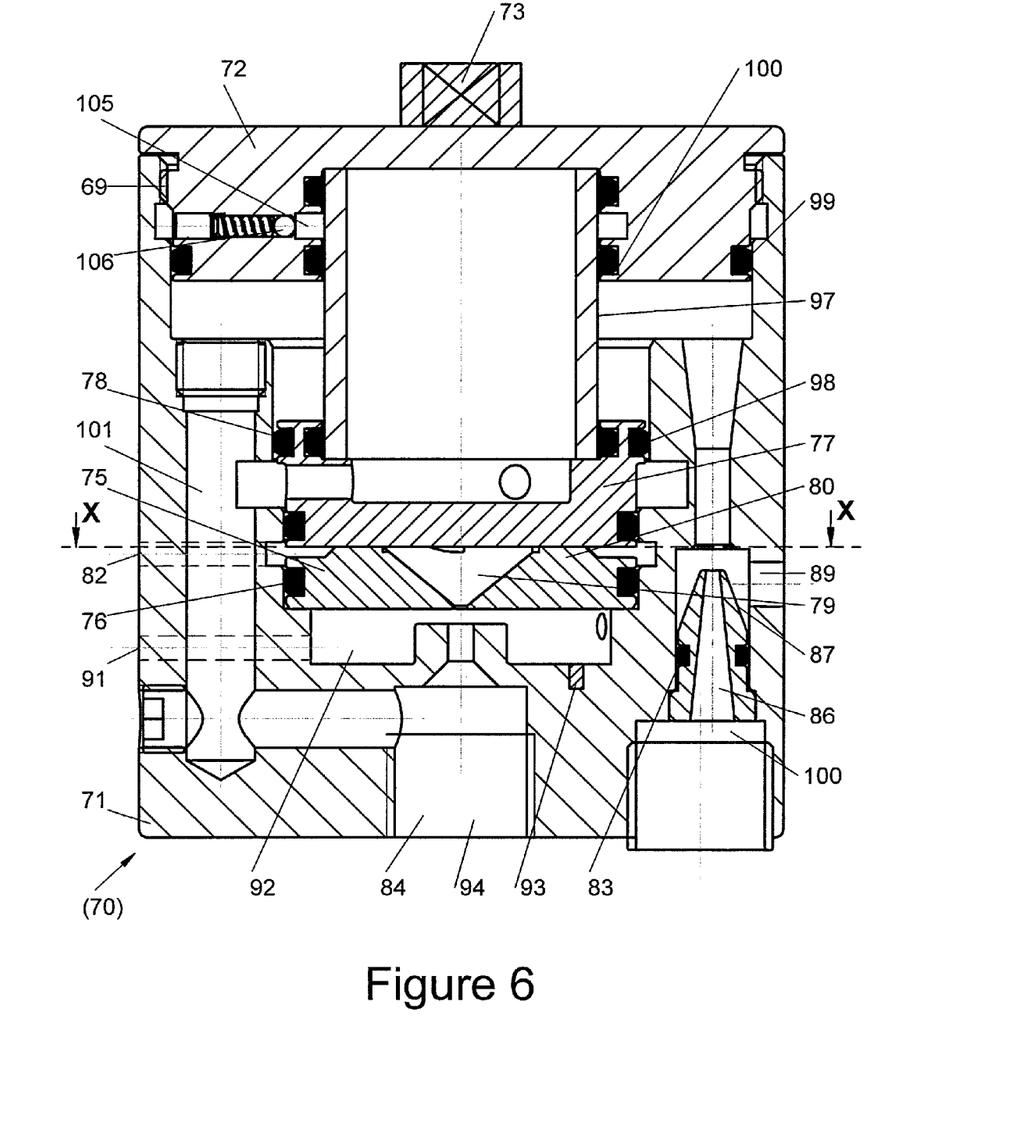

FIG. 6 shows a longitudinal cross section of a mist generation unit 70, suitable for use in the above described embodiments.

The mist generation unit 70 incorporates a outer body 71 and an end cap 72. Preferably, the end cap 72 is attached to the outer body 71 by a suitable detachable means. As shown, by way of example only, said end cap 72 is screwed 69 into the body 71 and two flats 73 are provided and the end cap to assist both parts to be tightened together.

Located in the outer body 71 is a vortex plate 75 which is preferably sealed to said outer body 71 by elastomer 76.

Clamp plate 77 sits adjacent to the vortex plate 75 and again is preferably sealed to the outer body 71 by elastomer 78.

The vortex plate 75 incorporates a substantially conical hole 79 in its most radially inner portion. At least one enclosed communication slot 80 feeds air 81, entering the assembly through a suitable first outer body orifice 82, into the conical hole 79.

Simultaneously, a second air flow 85 is directed through the innermost radial portion 86 of venturi nozzle 87 creating a pressure differential to the outermost radial portion 88 of venturi nozzle 87. Preferably venturi nozzle 87 is sealed to outer body 71 by elastomer 83.

A second outer body orifice 89 communicates with the most outer radial portion 88 of venturi nozzle 87. A mist return line 90 is connected to said second outer body orifice and a suitable orifice on the bearing housing (not shown).

An oil feed line (not shown) is connected from a third outer body orifice 91 to the reservoir (not shown).

In operation, the air 81 increases in velocity as it travels through the conical hole 79 and into communication orifice 84 and the bearing housing (not shown). This in turn has a pulling effect on the lubrication fluid from the reservoir, thus pulling it through the feed line, through the third outer body orifice 91 and into the oil second reservoir 92, which is a radially extending recess in outer body 71.

Preferably inserted in said recess is at least one magnet 93 which acts to attract any metallic debris in the lubrication fluid thus filtering it.

As the oil level in the second reservoir 92 increases, it comes in contact with the air 81 flowing through the conical hole 79 of vortex plate 75. As the air 81 and oil mix, a fine oil mist 94 is created, and travels into the communication orifice 84 and the bearing housing (not shown).

When oil mist 94 exits the bearing it travels through the return line (not shown) and into orifice 89. The returned oil mist 94 then mixes with the second air flow 85 and is moved adjacent to the filter 97 which is sealed to the outer body 71 by elastomers 98, 99 and 100.

As the oil mist 94 is pushed through the filter 97 it coalesces the oil mist 94 back into liquid form. The liquid oil then runs down the inner most radial surface of the filter 97 and through communication orifice 101 and orifice 84 back into the bearing chamber and reservoir (not shown).

The filtered air 85 travels through orifice 105 and past the non-return valve 106 to vent to atmosphere.

Figure 7:
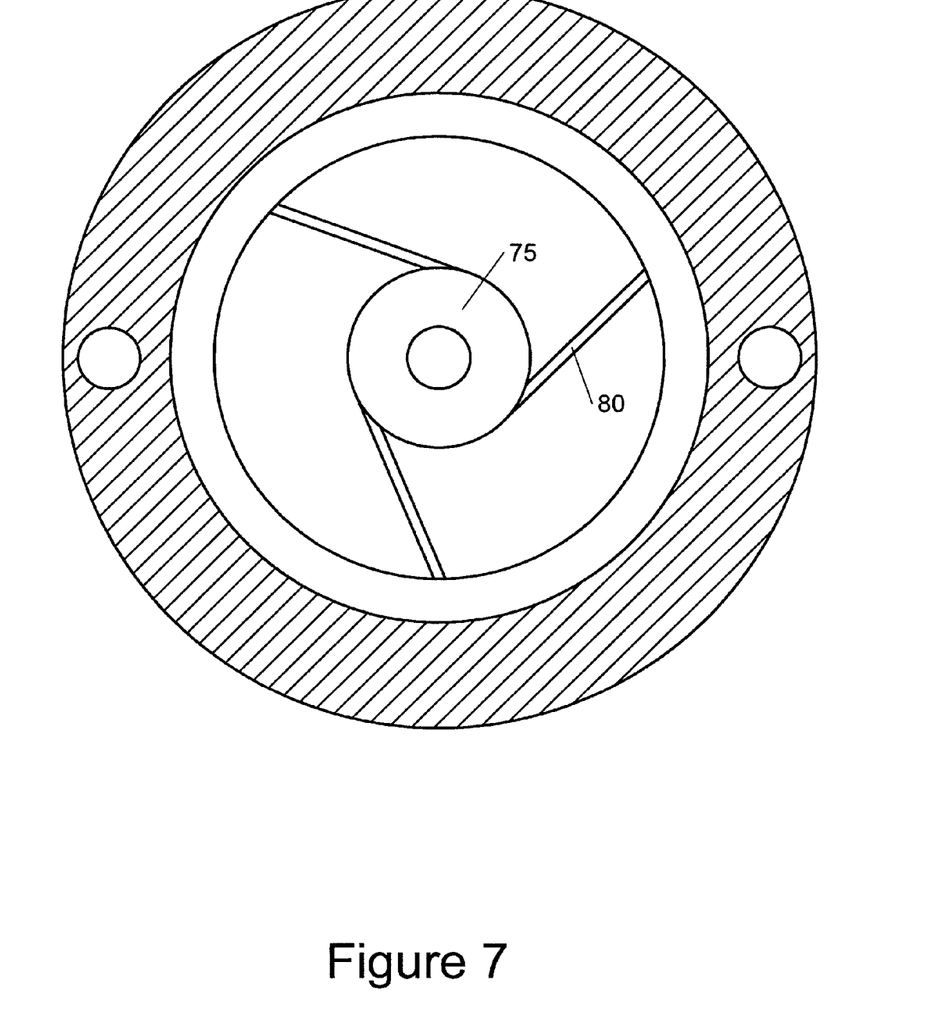

FIG. 7 corresponds to FIG. 6 and shows the view on Section X-X, specifically the enclosed substantially parallel communication channels 80 in vortex plate 75, and how they enter the conical hole 79 in a substantially tangential manner.

Figure 8:
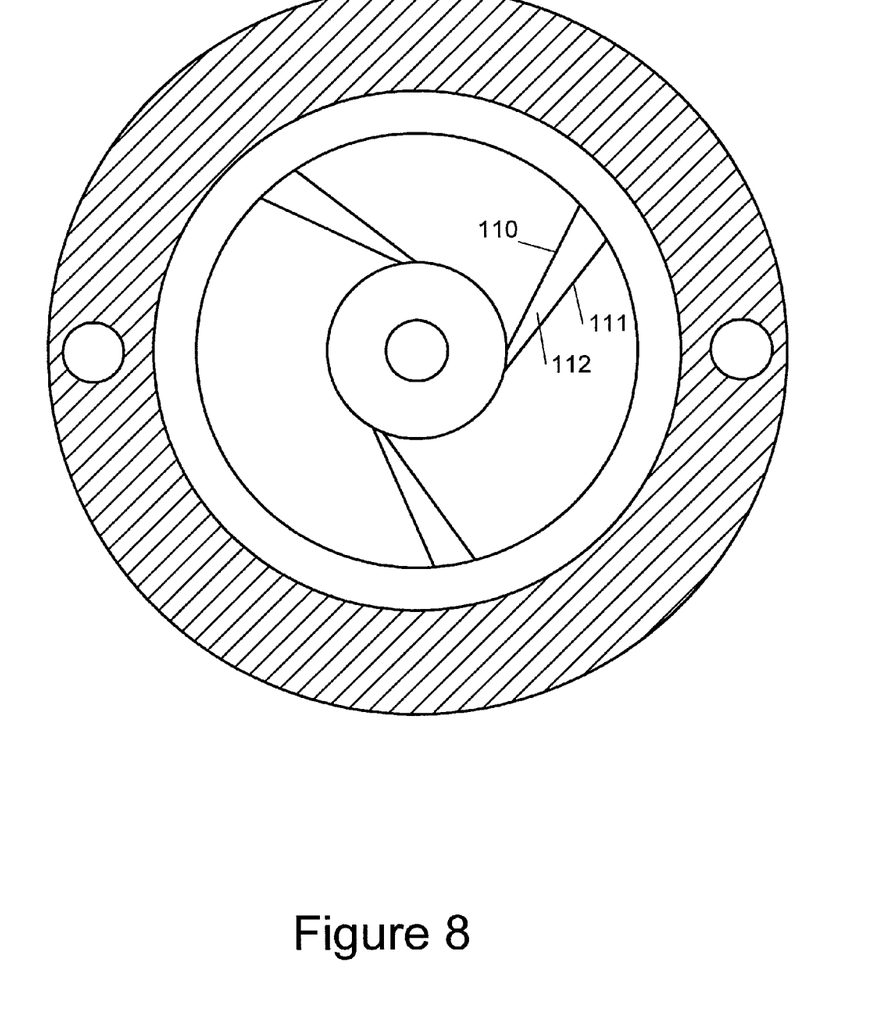

FIG. 8 also corresponds to FIG. 6 and shows an alternate view on Section X-X, whereby the surfaces 110 and 111 of the enclosed communication channels 112 in vortex plate 113, are substantially inclined, being divergent in a radially outwards direction.

Figure 9:
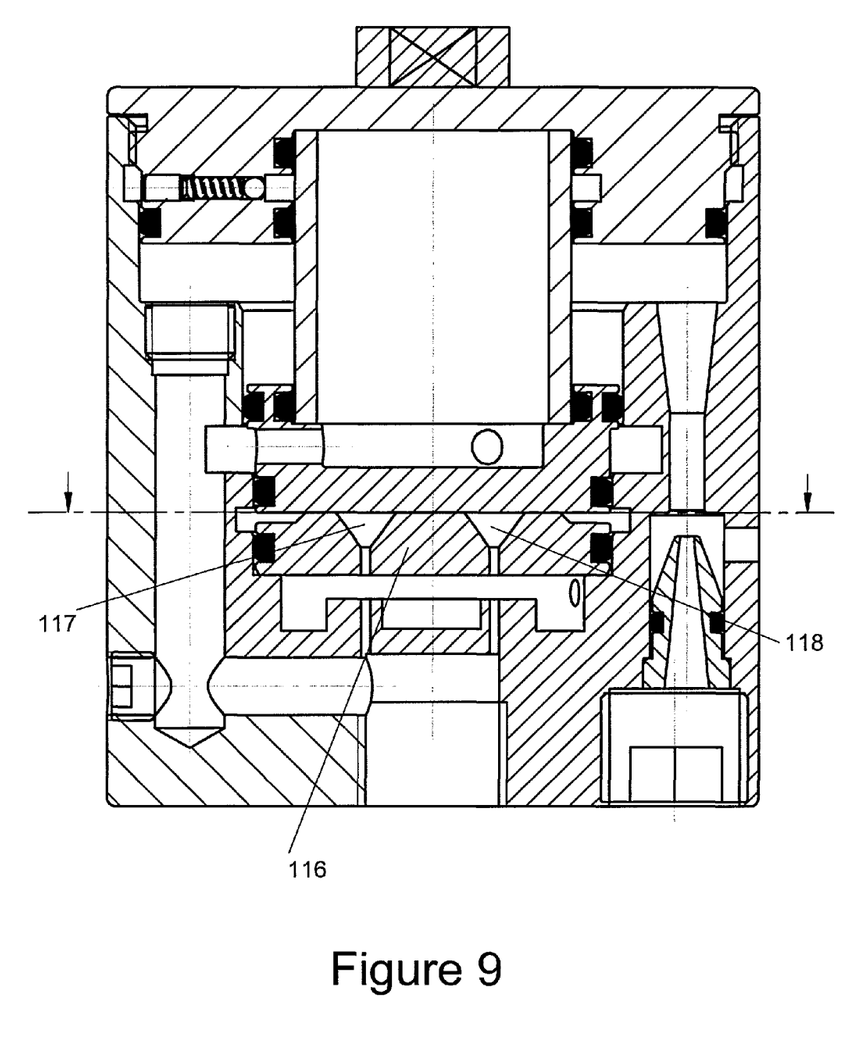

FIG. 9 shows a longitudinal cross section of an alternate mist generation unit 115 of the invention. As shown, the vortex plate 116 has multiple conical orifices 117 and 118, therefore generating more oil mist from a substantially modular unit to that previously shown.

Figure 10:
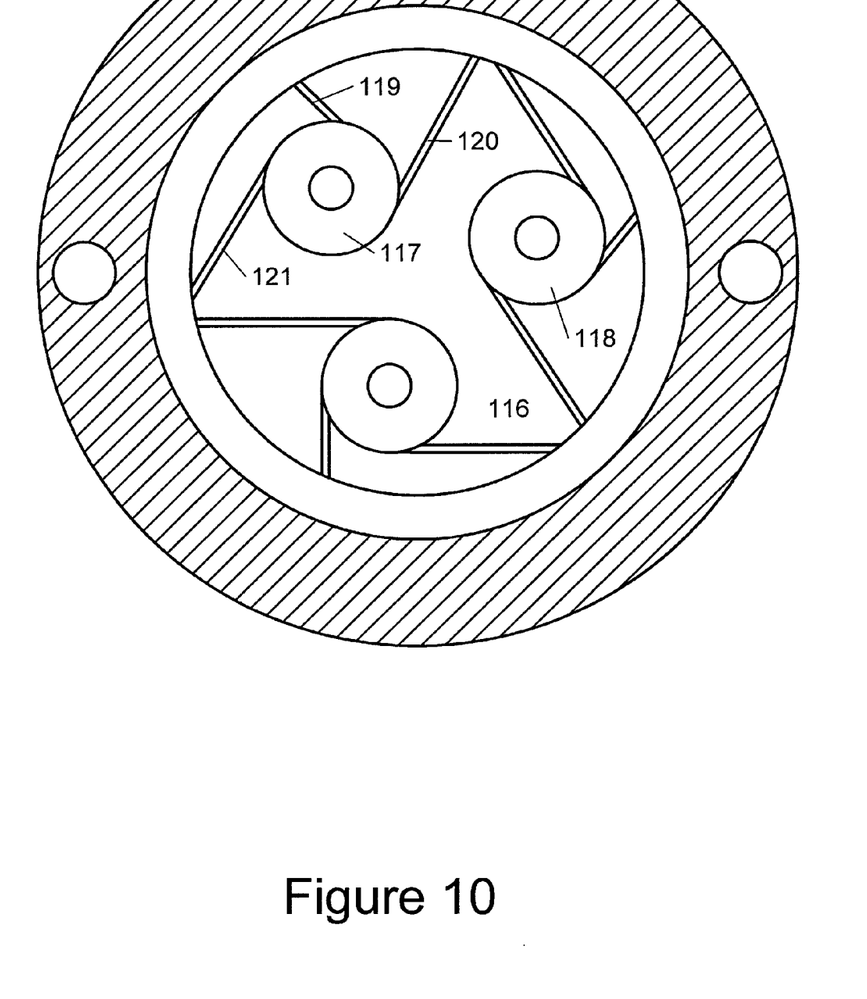

FIG. 10 corresponds to FIG. 9 and shows the view on Section Y-Y whereby the multiple conical orifices 117 and 118 are fed tangentially by multiple communication channels 119, 120 and 121 in vortex plate 116.

Figure 11:
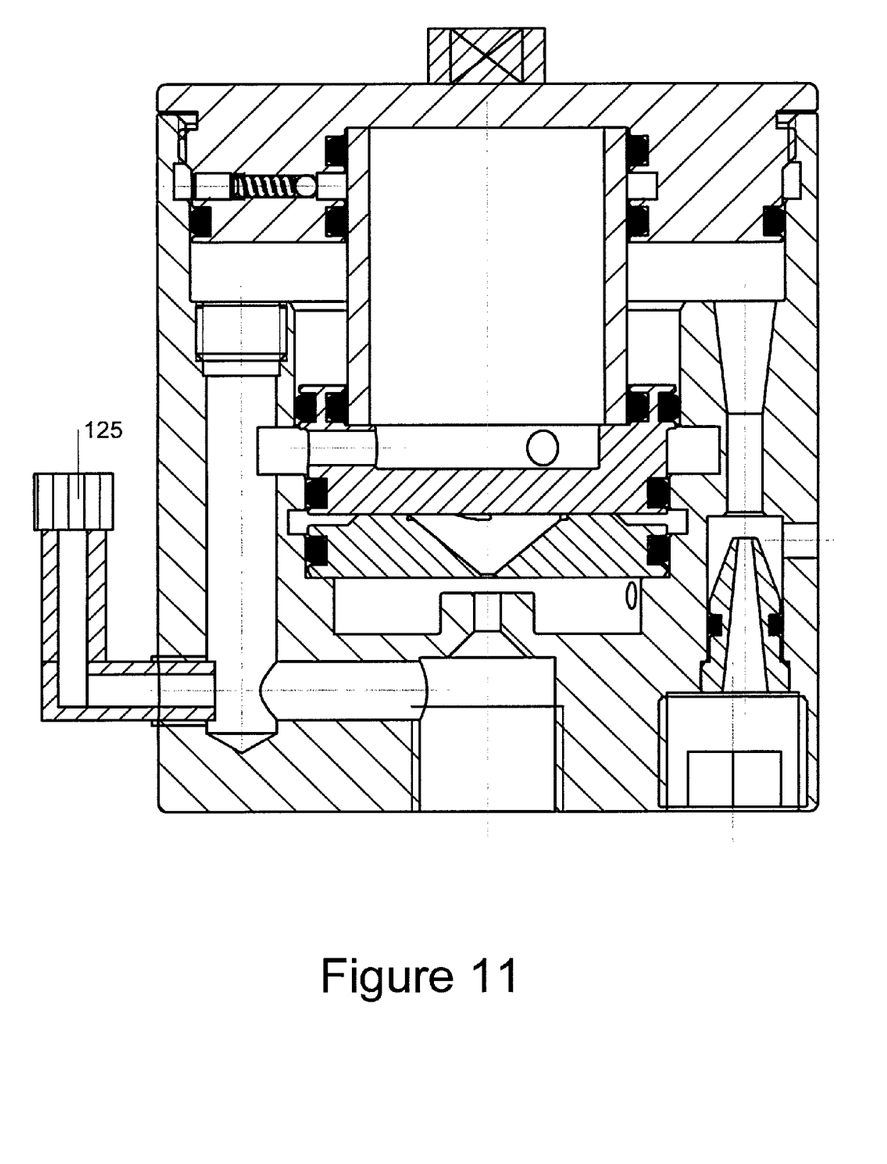

FIG. 11 corresponds to FIG. 6 and shows, by way of example only, the option to remotely, via inlet cap 125, add lubricant fluid into reservoir (not shown) in order to increase the lubricant fluid level in the reservoir.

Figure 12:
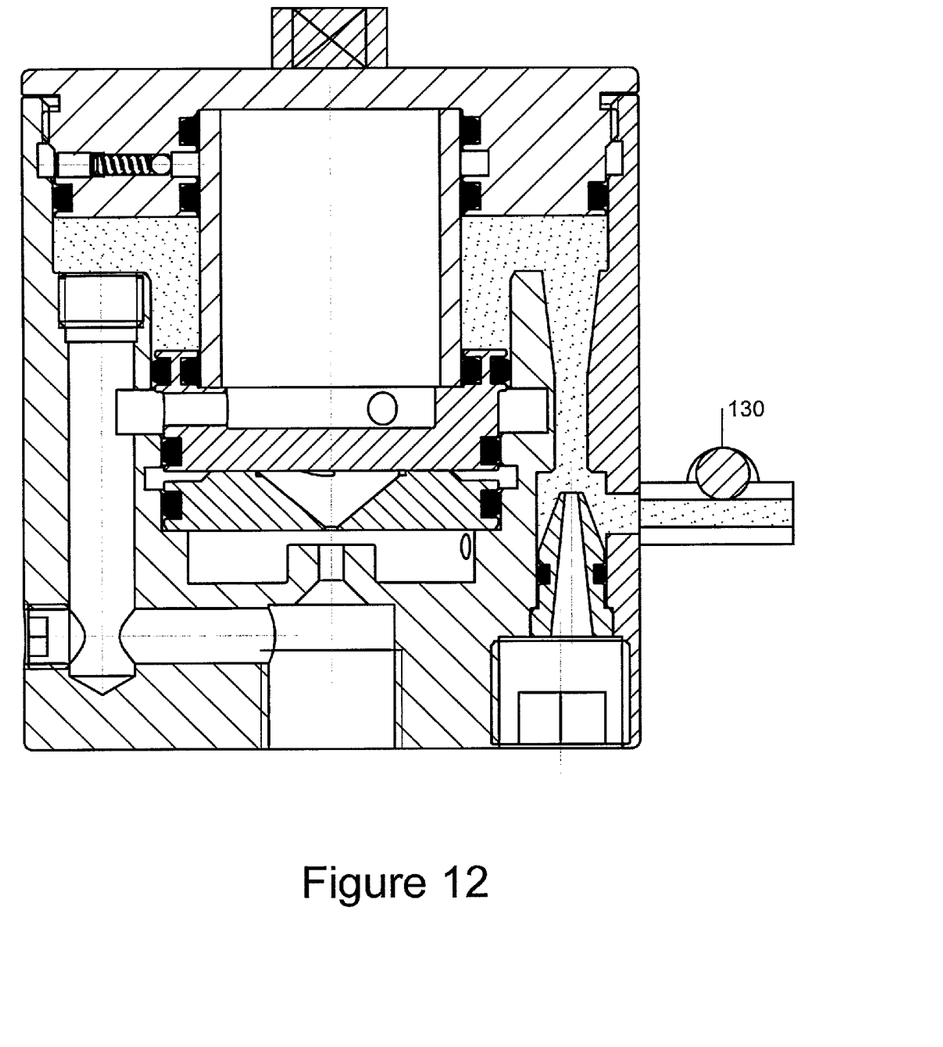

FIG. 12 corresponds to FIG. 6 and shows, by way of example only, the option to add a mist return flow-monitoring device 130 which detects a no/low flow condition and alerts the user.

The invention claimed is:

1. A lubrication apparatus for lubricating a surface of at least one component of a piece of equipment, comprising:
   a lubrication mist generating unit in which air and a lubricant are combined for forming a lubricant mist;

a bearing chamber operable as a reservoir for supplying the lubricant to said lubrication mist generating unit with said lubrication mist generating unit being located on top of said bearing chamber;

means for sucking the lubricant from said reservoir to said lubrication mist generating unit being located within said lubrication mist generating unit; and, means for directly connecting, without any intervening conduits, said lubrication mist generating unit to said piece of equipment at a position adjacent to said surface of said at least one component.

2. The lubrication apparatus for lubricating a surface of at least one component of a piece of equipment according to claim 1, wherein said lubrication mist generating unit includes a vortex with air entering said vortex, and further comprising an oil supply proximate to said vortex supplying oil for mixing with the air in said vortex for forming said lubricant mist.

3. The lubrication apparatus for lubricating a surface of at least one component of a piece of equipment according to claim 2, further comprising an air communication device between said vortex and a supply of air, said air communication device having a constricted channel entering said vortex in a substantially tangential manner.

4. The lubrication apparatus for lubricating a surface of at least one component of a piece of equipment according to claim 3, wherein said constricted channel has sides that are substantially parallel in, at least one of, width and depth.

5. The lubrication apparatus for lubricating a surface of at least one component of a piece of equipment according to claim 2, wherein said lubrication mist generating unit includes a plurality of vortexes.

6. The lubrication apparatus for lubricating a surface of at least one component of a piece of equipment according to claim 1, wherein said lubrication mist generating unit includes a venturi with air entering said venturi, and further comprising an oil supply proximate to said venturi supplying oil for mixing with the air in said venturi for forming said lubricant mist.

7. The lubrication apparatus for lubricating a surface of at least one component of a piece of equipment according to claim 1, wherein said lubricant mist generating unit includes a mist return orifice communicating to a venturi cavity, with the venturi cavity further communicating with an air stream.

8. The lubrication apparatus for lubricating a surface of at least one component of a piece of equipment according to claim 7, wherein the venturi cavity has at least one substantially conical surface.

9. The lubrication apparatus for lubricating a surface of at least one component of a piece of equipment according to claim 1, further comprising an air pre-conditioning system for controlling quality of the air to said lubrication must generating unit.

10. The lubrication apparatus for lubricating a surface of at least one component of a piece of equipment according to claim 1, wherein said lubrication mist generating unit includes a lubricant refill device.

\* \* \* \* \*